(12) United States Patent
D'Auria et al.

(10) Patent No.: US 10,062,094 B2
(45) Date of Patent: *Aug. 28, 2018

(54) USER INTERFACE FOR ACCESSING AN APPLET IN A BROWSER ON A MOBILE DEVICE

(71) Applicant: Apple Inc., Cupertino, CA (US)

(72) Inventors: Anthony D'Auria, San Francisco, CA (US); David A. Carson, San Francisco, CA (US); Elizabeth C. Cranfill, Cupertino, CA (US); Richard R. Dellinger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 15/131,215

(22) Filed: Apr. 18, 2016

(65) Prior Publication Data

US 2016/0247208 A1    Aug. 25, 2016

Related U.S. Application Data

(63) Continuation of application No. 13/492,879, filed on Jun. 10, 2012, now Pat. No. 9,317,878.

(51) Int. Cl.
*G06Q 30/00* (2012.01)
*G06Q 30/02* (2012.01)
(Continued)

(52) U.S. Cl.
CPC .......... *G06Q 30/0277* (2013.01); *G06F 8/61* (2013.01); *G06Q 30/0241* (2013.01);
(Continued)

(58) Field of Classification Search
CPC .......... G06Q 30/0241; G06Q 30/0251; G06Q 30/0253–30/0256;
(Continued)

(56) References Cited

U.S. PATENT DOCUMENTS

| 8,161,370 B2 | 4/2012 | Nguyen |
| 9,317,878 B2 | 4/2016 | D'Auria et al. |

(Continued)

FOREIGN PATENT DOCUMENTS

| CN | 104364783 A | 2/2015 |
| DE | 112013002870 T5 | 3/2015 |

(Continued)

OTHER PUBLICATIONS

"U.S. Appl. No. 13/492,879, Examiner Interview Summary dated Sep. 9, 2015", 3 pgs.

(Continued)

*Primary Examiner* — William J Allen
(74) *Attorney, Agent, or Firm* — Invoke (57) ABSTRACT

Information about a product advertised on a web page is presented separately, but concurrently, with the content of the web page, to avoid having to navigate away from the web page. The information may be automatically presented in a banner that is displayed adjacent the content of the web page. Controls on the banner initiate the display of further information, and/or enable purchase of the product, while maintaining the web page content in view on the browser. Alternatively, the display of the product information may be triggered by user selection of a link associated with that product. The information about the product may appear in an overlay sheet displayed in front of the original web page. The user can interact with controls on the sheet to initiate purchase or download of the product, or can dismiss the overlay sheet to continue viewing the content of the web page.

20 Claims, 11 Drawing Sheets

(51) Int. Cl.
  *G06Q 30/06* (2012.01)
  *G06F 8/61* (2018.01)
  *H04L 29/08* (2006.01)
  *H04W 4/60* (2018.01)
  *H04M 1/725* (2006.01)
  *H04W 4/00* (2018.01)

(52) U.S. Cl.
  CPC ..... *G06Q 30/0253* (2013.01); *G06Q 30/0631* (2013.01); *G06Q 30/0641* (2013.01); *G06Q 30/0643* (2013.01); *H04L 67/2838* (2013.01); *H04M 1/72525* (2013.01); *H04M 1/72561* (2013.01); *H04W 4/003* (2013.01); *H04W 4/60* (2018.02)

(58) Field of Classification Search
  CPC .............. G06Q 30/0263–30/0264; G06Q 30/0269–30/0271; G06Q 30/0277; G06Q 30/0601–30/0643; H04L 67/00; H04L 67/02; H04L 67/16; H04L 67/26; H04L 67/28; H04L 67/2838; H04L 67/306; H04L 69/329; G06F 8/60–8/78
  See application file for complete search history.

(56) References Cited

U.S. PATENT DOCUMENTS

| | | |
|---|---|---|
| 2003/0023754 A1 | 1/2003 | Eichstadt et al. |
| 2004/0181448 A1 | 9/2004 | Hartsman et al. |
| 2005/0119935 A1 | 6/2005 | Boss et al. |
| 2006/0053048 A1 | 3/2006 | Tandetnik |
| 2008/0004954 A1 | 1/2008 | Horvitz |
| 2008/0091549 A1 | 4/2008 | Chang et al. |
| 2009/0197582 A1 | 8/2009 | Lewis et al. |
| 2009/0254824 A1* | 10/2009 | Singh ................ G01C 21/3679 715/716 |
| 2010/0070529 A1 | 3/2010 | Gokturk et al. |
| 2010/0083191 A1 | 4/2010 | Marshall |
| 2011/0022468 A1 | 1/2011 | Muster et al. |
| 2011/0246296 A1 | 10/2011 | Howard et al. |
| 2012/0227035 A1 | 9/2012 | Obasanjo et al. |
| 2012/0246003 A1 | 9/2012 | Hart et al. |
| 2012/0284247 A1 | 11/2012 | Jiang et al. |
| 2012/0323732 A1 | 12/2012 | Rothman et al. |
| 2012/0323898 A1 | 12/2012 | Kumar et al. |
| 2013/0103498 A1 | 4/2013 | Wei |
| 2013/0166376 A1 | 6/2013 | Cohen et al. |
| 2013/0332318 A1 | 12/2013 | D'auria et al. |

FOREIGN PATENT DOCUMENTS

| | | |
|---|---|---|
| KR | 1020080060898 A | 7/2008 |
| WO | WO-2013188270 A2 | 12/2013 |
| WO | WO-2013188270 A3 | 12/2013 |

OTHER PUBLICATIONS

"U.S. Appl. No. 13/492,879, Examiner Interview Summary dated Dec. 16, 2014", 3 pgs.
"U.S. Appl. No. 13/492,879, Final Office Action dated Feb. 3, 2015", 19 pgs.
"U.S. Appl. No. 13/492,879, Non Final Office Action dated Jun. 8, 2015", 17 pgs.
"U.S. Appl. No. 13/492,879, Non Final Office Action dated Sep. 19, 2014", 20 pgs.
"U.S. Appl. No. 13/492,879, Notice of Allowance dated Dec. 10, 2015", 10 pgs.
"U.S. Appl. No. 13/492,879, Response dated May 4, 2015 to Final Office Action dated Feb. 3, 2015", 13 pgs.
"U.S. Appl. No. 13/492,879, Response filed Aug. 27, 2014 to Restriction Requirement dated Jun. 27, 2014", 9 pgs.
"U.S. Appl. No. 13/492,879, Response dated Nov. 9, 2015 to Non Final Office Action dated Jun. 8, 2015", 13 pgs.
"U.S. Appl. No. 13/492,879, Response dated Dec. 19, 2014 to Non Final Office Action dated Sep. 19, 2014", 15 pgs.
"U.S. Appl. No. 13/492,879, Restriction Requirement dated Jun. 27, 2014", 7 pgs.
"International Application Serial No. PCT/US2013/044928, International Search Report dated Apr. 15, 2014", 3 pgs.
"International Application Serial No. PCT/US2013/044928, Written Opinion dated Apr. 15, 2014", 7 pgs.
Gary, Anthens, "Invasion of the Mobile Apps", Communicaotin of the ACM. vol. 54. No. 9., (Sep. 2011).

* cited by examiner

USER INTERFACE FOR ACCESSING AN APPLET IN A BROWSER ON A MOBILE DEVICE

CLAIM OF PRIORITY

This application is a continuation of and claims the benefit of priority to U.S. patent application Ser. No. 13/492,879, filed Jun. 10, 2012, which is hereby incorporated by reference herein in its entirety.

FIELD

The present disclosure is generally directed to a user interface for a browser on a computing device, and more particularly to a browser interface that facilitates the user's ability to view and/or purchase a product referenced on a web page.

BACKGROUND

It has become common for all different types of organizations to develop individualized application programs known as applets (or "apps") for use on computing devices. The applets enable the user to obtain information about, and/or interact with, the organization in a variety of different ways. For instance, the user may manage a bank account, reserve a room at a hotel, order a product for purchase, obtain reviews about an event or establishment, etc.

One mechanism for the organizations to offer their applets to users is to advertise the applets on the organization's own website, and possibly the websites of other entities. Typically, the advertisements appear on web pages and include a link that can be selected by the user to initiate the purchase and/or download of the desired applet. When the user selects the link, it causes the browser executing on the computing device to retrieve a page associated with the site from which the applet can be obtained. For instance, this site may be an online applet store that provides applets suitable for use with the operating system of the user's device.

This type of transaction is not specific to the purchase of applets, or other forms of digital media. Rather, it is commonly employed with any type of product that can be viewed and/or purchased via a reference in a web page.

SUMMARY

It is desirable to facilitate a user's ability to view information about, and/or purchase, a product advertised on a web page. In accordance with described embodiments, information pertaining to a product advertised on a web page is presented separately, but concurrently with the content of the web page. In one embodiment, the information about the product may be automatically presented in a banner, or the like, that is displayed adjacent the content of the web page. The user can interact with controls on the banner to initiate the display of further information, and/or purchase the product. In the case of digital content, the banner can provide direct access to that content once it is downloaded to the computing device. In another embodiment, the display of the product information may be triggered by user selection of a link associated with a product. In this case, the information about the product may appear in an overlay sheet displayed in front of the original web page. The user can interact with controls on the sheet to initiate purchase or download of the product, or can dismiss the overlay sheet to continue viewing the content of the web page.

Web page context can be encoded in an object, such as a tag, that causes the banner to be displayed. When the user returns to the web page with the tag after purchasing an applet, the interface of the banner displays download progress. After the download is complete, the user is able to launch the installed applet directly from the web page, and the browser passes the context specified by the web page to the applet. This permits the user to resume in the applet just where he or she left off in the web page.

In some embodiments, when a banner or overlay sheet is displayed to provide information about, and/or initiate the purchase of, an advertised product, the browser does not navigate away from the web page that the user was initially viewing, to present a new page associated with the product of interest. Rather, the banner or overlay sheet contains suitable functionality to enable the viewing and/or purchasing to be directly implemented therein. Once the user has finished reading about the product, and/or completed a purchase, the banner or overlay sheet can be dismissed, so that the user is back at the original web page of interest, without having to manually navigate to it.

Further features and advantages of these and other embodiments are described hereinafter with reference to exemplary embodiments illustrated in the accompanying drawings.

DETAILED DESCRIPTION

To facilitate an understanding of the concepts and principles underlying the disclosed invention, a description is presented hereinafter with particular reference to examples involving the purchase and/or download of applets that are advertised on a web page. It will be appreciated, however, that the practical implementations of the invention are not limited to that particular type of transaction. Rather, various features and behavior of the disclosed browser can be employed in conjunction with other types of advertised products, including other forms of digital media that can be downloaded onto the user's device, such as music and videos, as well as non-digital products that can be purchased for physical delivery. Moreover, some features described herein are not limited to purchasing transactions. Rather, they are generally applicable to accessing any type of information that is associated with a product or service that is advertised, or otherwise referenced, on a web page.

Figure 1:
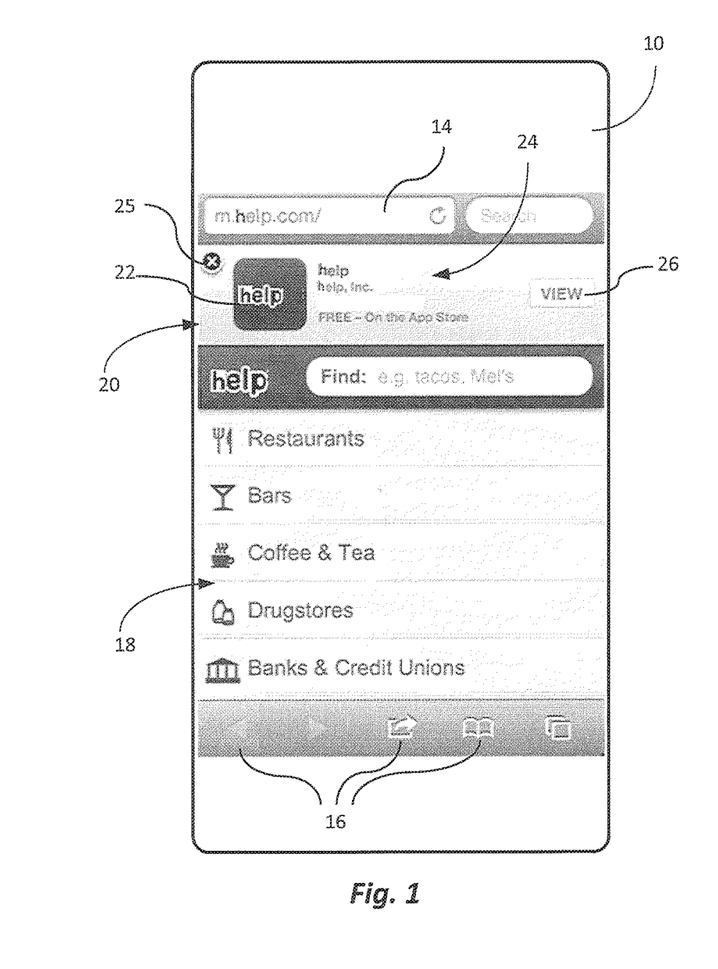
FIG. 1 is an illustration of a first instance of a browser interface in accordance with an embodiment.

FIG. 1 illustrates an example of a browser interface in accordance with a first embodiment. In this example, the browser is displayed on a mobile computing device 10, such as a smartphone. The browser interface includes an address field 14 that displays the URL of a web page that is currently being displayed. The address field also functions as an input area, to enable the user to navigate to a new page, by entering a different address. The browser may contain various controls 16 that enable the user to navigate to other viewed pages, mark the current page for future access, share the page with others via various types of media, etc.

The web page 18, which is referenced by the URL in the address field 14, appears in the central portion of the interface. In the illustrated example, the web page pertains to an organization that provides reviews and other information about area establishments. This organization may offer an applet for the information it provides. Conventionally, the availability of the applet may be announced by a link, or other form of advertisement, that is embedded in the content of the web page 18. In accordance with the illustrated embodiment, information about the available applet is presented in a user interface object that is separate from the content of the web page 18. In the illustrated example, the user interface object is a banner 20. The banner presents a view that is provided by an online applet store, or other suitable site, through which the applet can be obtained. In the illustrated example, the banner contains a thumbnail image 22 associated with the applet, a short description 24 of the applet, in this case the name of the applet, the entity who is providing it, and the price to purchase the applet. In this particular example, the applet is free. A close control button 25 enables the user to dismiss the banner from the display if the applet is not of interest.

Figure 2:
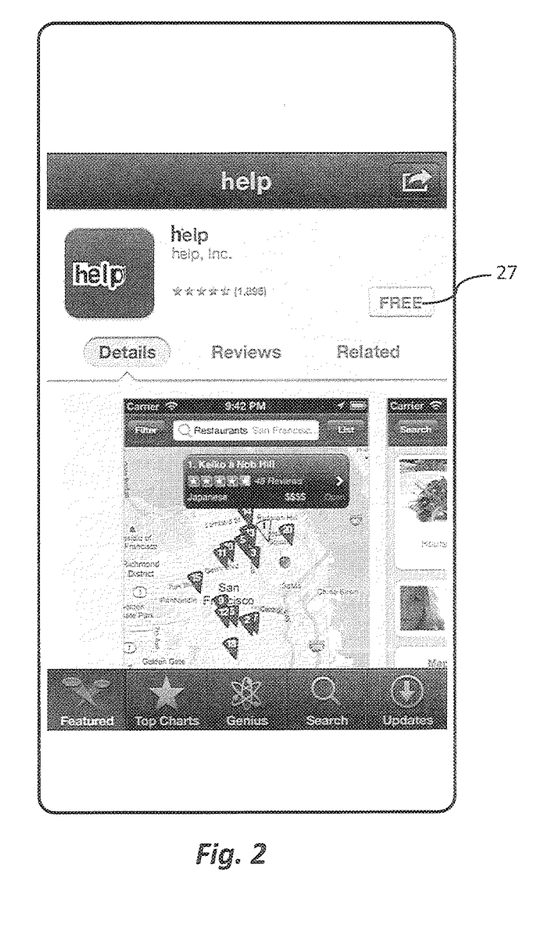
FIG. 2 is an illustration of a second instance of the browser interface.

If the user may possibly be interested in the applet, tapping or clicking on an action button 26 causes the browser to access the online store from which the applet can be obtained. As illustrated in FIG. 2, the information provided by the online store about the applet now appears in the browser interface. If the user decides to purchase the applet, he or she can initiate a purchasing transaction by clicking or tapping on a purchase button 27. In the case of a free applet, tapping the button causes the applet to be immediately downloaded from the online store.

Figure 3:
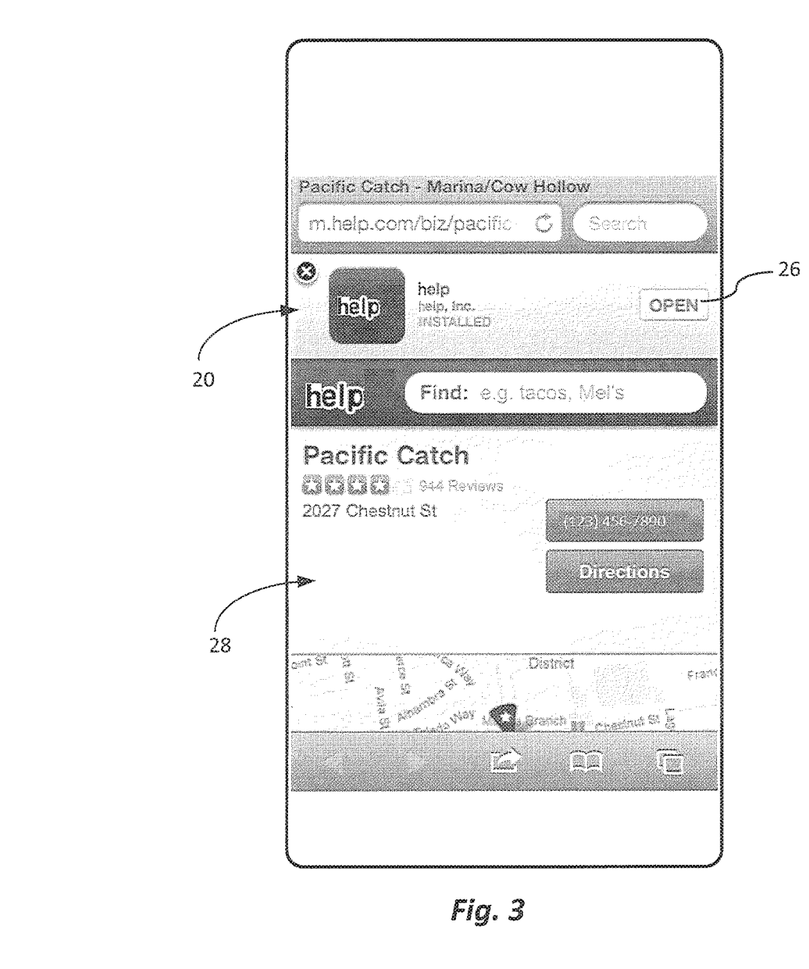
FIG. 3 is an illustration of a third instance of the browser interface.

Once the downloading and installation of the applet begins, the user can return to browsing on the web. If the user returns to the original page, or goes to another page that includes a reference to the applet, the banner 20 again appears, as illustrated in FIG. 3, and indicates the status of the download and installation procedure. When the installation is complete, the banner may display the term "Installed," as shown in the figure. In addition, the action button 26 is enabled with new functionality, and launches the applet when it is activated by a tap or click.

In one embodiment, the banner associated with the advertised applet can automatically appear as the content of the web page is being displayed by the browser. This functionality can be achieved by placing a tag in the content of the web page. As the web page data is being downloaded and analyzed, when the browser detects the tag, it can automatically display the banner in accordance with information contained in the tag.

One example of an HTML tag that can be employed for this purpose is <meta name="online-store-app" content="app-id=[app ID in Online Store], affiliate-data=[affiliate string], app-argument=[data for app launch]">. In this example, the first component of the tag, meta name="online-store-app", is an identifier of the resource from which the information about the applet is obtained, in this case an online applet store. This identifier acts as a flag to inform the browser that a banner is to be displayed. The content portion of the tag contains an applet identifier, app-id=[app ID in Online Store], for the particular applet whose information is to be displayed.

The content can also include two optional items of information. One item, app-argument=[data for app launch], is the context that the web page developer desires the applet to go to. For instance, in the example of FIGS. 1-3, as the applet was being downloaded and installed, and the user returned to the original web page, the user may have selected a particular restaurant listed on the web page, to read its reviews. If, a web page 28 pertaining to that restaurant is being displayed, and the user launches the applet from the banner 20, when the applet opens it will retrieve the review information for the selected restaurant. This is accomplished by including context information in the tag that is embedded in the content for the page that contains the restaurant information. When the applet is launched, this context information is passed to the applet, so that the user can start the applet where he or she left off in the web browsing.

The third item of information that can be included in the tag content is affiliate data, affiliate-data=[affiliate string]. This data provides a way for the owner of the website being displayed to receive credit for advertising the product that the user accesses, in this case the applet.

Figure 4:
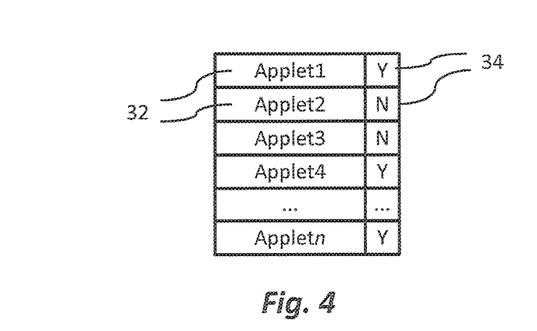
FIG. 4 is a list of banner identifiers and associated display flags.

As noted previously, when the initial image of the banner appears as shown in the example of FIG. 1, if the user is not interested in the advertised applet, the banner can be dismissed by tapping or clicking upon the close button 25. In one embodiment, performing this operation to remove the banner can have a persistent result. Referring to FIG. 4, if the user taps the close button 25, or performs a similar type of action to dismiss the banner, e.g. a horizontal swipe, the browser can record an identifier 32 for that banner in a list. A display on/off flag 34 can be stored in association with each recorded banner identifier. The default value for the flag is N (no), to record the fact that the banner is not to be displayed. Thereafter, each time a web page is downloaded that includes a banner identifier, that identifier is checked against the list of previously recorded identifiers. If it is found in the list, the value of the display indicator is checked to determine whether the banner should be displayed.

This behavior is dependent only upon the identification of the banner itself, and is independent of the particular web page in which the banner identifier appears. Since each banner pertains to a particular product, in this case an applet, a unique identifier of that product can be stored in the list. Thus, if the developer advertises an applet via a number of different web sites, once the user has indicated that he or she is not interested in the applet by dismissing the banner, the banner will no longer appear on the user's device, regardless of whether the user accesses the same web page, or any of the other web pages that are used to advertise the applet.

It may be the situation that, after the user has dismissed a banner pertaining to an applet, the user installs that applet on his or her device through some other interface, e.g. by directly going to the online applet store. In that case, once the applet is installed, the display indicator for that applet can be changed from N to Y (yes). Thereafter, whenever the user accesses a web page containing an identifier for the applet, the browser will display the banner as shown in FIG. 3, to enable the user to quickly launch the applet referenced in that web page.

In the example described above, the HTML tag contains information for one applet. It is also feasible to include multiple applet identifiers in a single tag. In this case, each identified applet is displayed in a separate banner. When multiple banners are displayed simultaneously, if the user taps the close button 25 to dismiss one of the banners, only the display indicator for that banner is recorded with a flag set to N, so that the banner associated with that applet will be blocked from further display. However, the banners for the other applets identified in the HTML tag are not blocked.

In the preceding examples, clicking or tapping on the action button 26 when the banner appears, as shown in FIG. 1, causes the browser to navigate away from the web page 18 and display the online store page pertaining to the applet. Once the user has performed the desired actions with respect to the applet, the user can then cause the browser to navigate back to the page that was being viewed, or to another page, for instance by entering an address in the field 14. In another embodiment, the banner itself provides the functionality to perform the desired actions to initiate a purchase. In this case, the purchase transaction can be conducted without having to navigate away from the web page that is being viewed.

Figure 5:
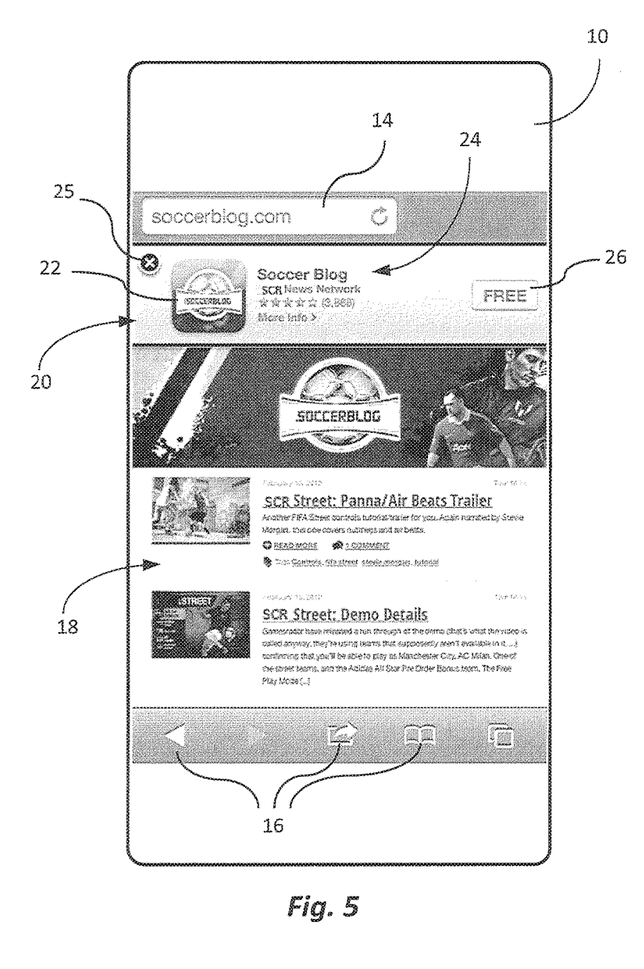
FIG. 5 is an illustration of a first instance of a browser interface in accordance with another embodiment.

FIG. 5 illustrates an example of a browser interface in accordance with this latter embodiment. As in the previous examples, the browser interface includes an address field 14 that displays the URL of a web page that is currently being displayed, and controls 16 that enable the user to navigate to other viewed pages, mark the current page for future access, share the page with others via various types of media, etc. In this example, the displayed web page 18 pertains to a blog for a sporting organization. This organization may also offers an applet for its viewers. Information about the available applet is presented in a banner 20. In this example, the price of the applet (or the fact that it is free) appears as a label on the action button 26.

Figure 6:
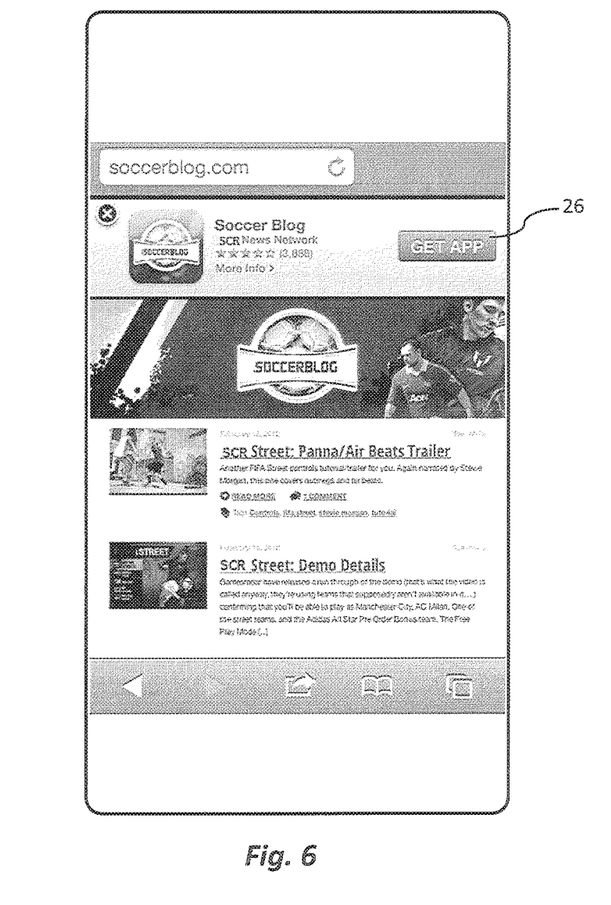
FIG. 6 is an illustration of a second instance of the browser interface.
Figure 7:
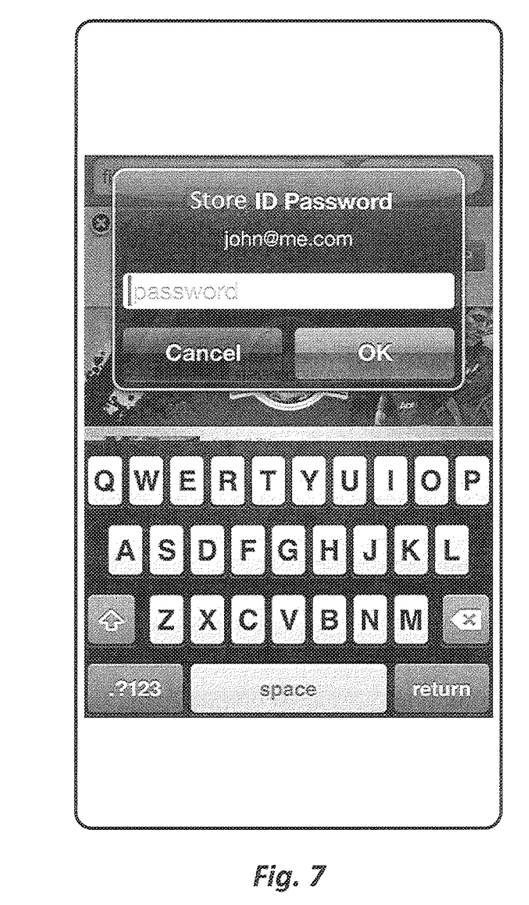
FIG. 7 is an illustration of a third instance of the browser interface.

If the user may possibly be interested in the applet, tapping or clicking on an action button 26 switches its functionality, and its displayed label, to change. As illustrated in FIG. 6, the button 26 now provides the user the opportunity to obtain the applet. If the user taps the button in this state, to retreive the applet, the user may be required to authenticate himself or herself to the online store, or other resource via which the applet is provided. FIG. 7 illustrates an example of a password entry screen with a keyboard, via which the user can input his or her password, an identifier, and/or any other information that may be required to access the resource.

Figure 8:
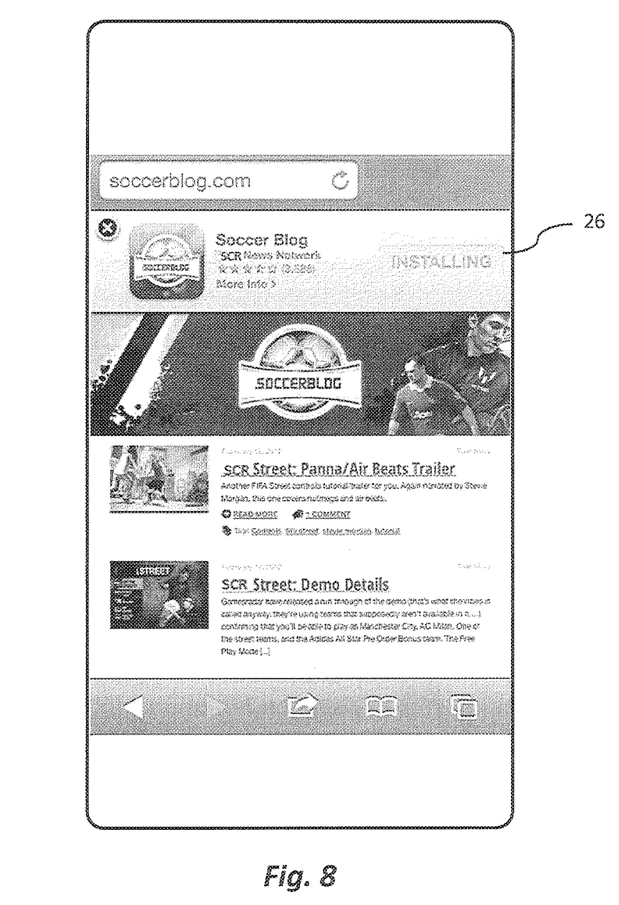
FIG. 8 is an illustration of a fourth instance of the browser interface.
Figure 9:
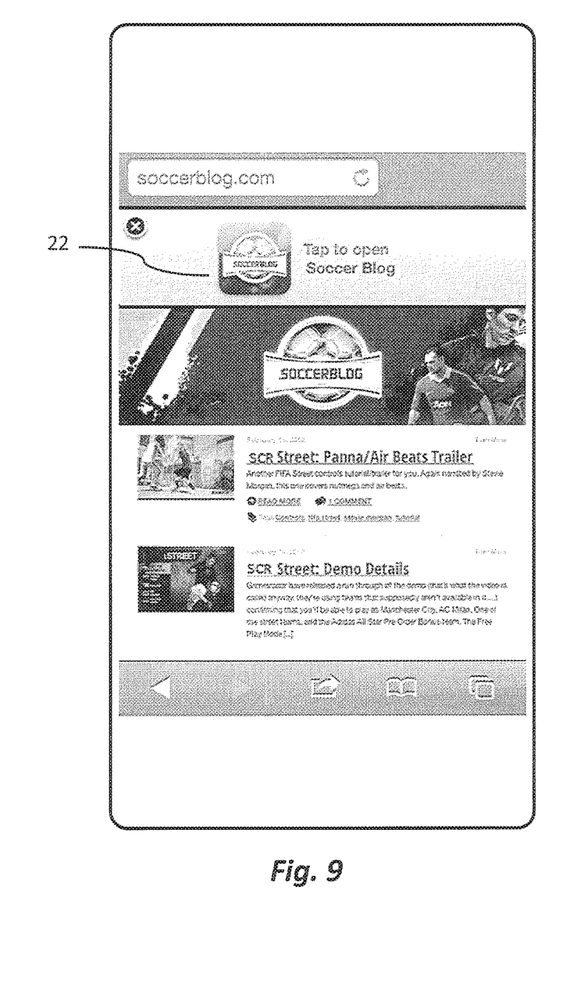
FIG. 9 is an illustration of a fifth instance of the browser interface.

Once the user has been authenticated, the applet is installed on the user's device 10. Referring to FIG. 8, the label of the button 26 changes during this time, to indicate that installation is taking place. After the installation is complete, the display of the banner 20 changes, as shown in FIG. 9. In this case, the button 26 is removed, and the banner contains the thumbnail image 22, or an icon, associated with the applet. By tapping on the banner, the user can launch the newly downloaded applet.

Figure 10:
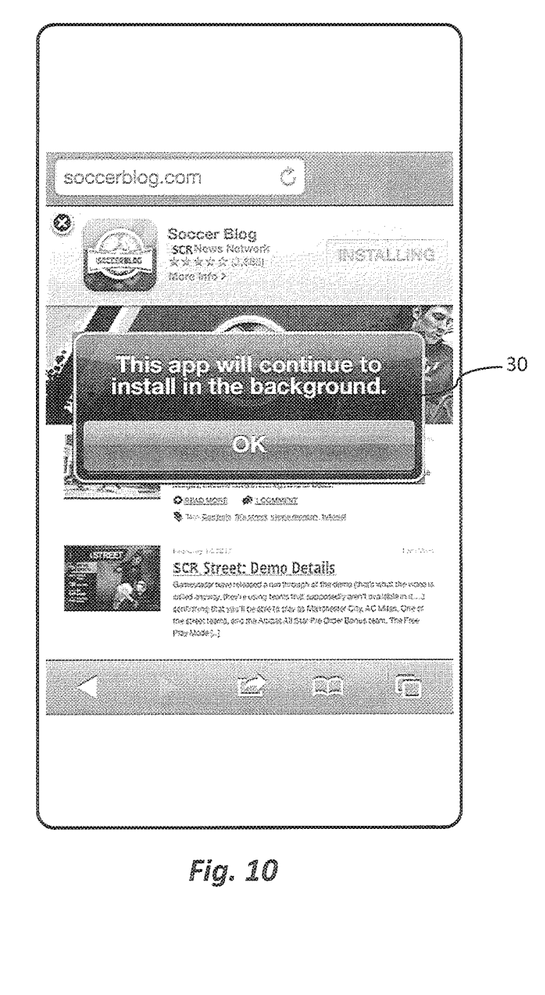
FIG. 10 is an illustration of a sixth instance of the browser interface.

In some cases, the user may not desire to have the banner displayed while the applet is being installed. In that case, the close button 25 can be tapped, or clicked upon, to remove the display of the banner during the installation. In such a situation, it may be desirable to display a notification 30, such as that shown in FIG. 10, to inform the user that the installation of the applet will continue even though the banner is being closed.

The banner that is employed to present information about an advertised product, and to enable the user to obtain that product, is generated by the operating system of the user device. In the illustrated examples, the banner is placed immediately above the content of the web page, by the browser. It will be appreciated, however, that other locations for the banner are also feasible. Normally, the banner is pinned to the web page, so that as the user moves down the page, the banner scrolls off the top of the browser viewing screen. It may be preferable, however, that during the time the applet is being installed (as depicted in FIG. 8), to have the banner pinned to the top of the viewing screen, rather than the web page content. In this manner, the user will continue to be apprised of the fact that the installation is occurring, even as he or she scrolls through the web page content.

Since the banner is generated by the operating system of the computing device, it is separate from the content of the web page via which the product identification was delivered. This separation of the purchasing functionality from the web page content offers a number of advantages. First, it enables the user to obtain information about the advertised product, and purchase or otherwise download the product, without navigating away from the web page, or otherwise interfering with the user's ability to continue to view the content of the web page. Second, the separation of the purchasing transaction, and entry of information pertaining thereto, from the web page content reduces privacy concerns. Since the entry of passwords and other identification information is controlled by the browser interface, and not by the content of the web page, the user can be more comfortable that he or she is not interacting with a fake banner that is tracking his or her actions.

Third, since the banner is separate from the content of the web page, it can be separately displayed in a thumbnail view. Thus, for example, if the user switches from a display of the browser to a home page, the banner can be displayed as a separate icon on the home page, rather than being incorporated in a thumbnail view of the browser.

In the preceding exemplary embodiments, the information pertaining to an advertised product is automatically displayed in the context of a banner, upon detection of a suitable tag in the content of a web page that is being downloaded. In accordance with another embodiment, the user interface object need not be automatically displayed upon opening the web page. Rather, the display can be triggered by an action of the user. For instance, an advertisement for a product on the web page may contain a link that enables the user to obtain information, and/or purchase the product. If the user clicks or taps on the link, the browser does not navigate to a new web page that is identified by the link, in the conventional manner. Rather, the resource referenced by the link appears in a user interface object that is displayed in front of the current web page, such as an overlay sheet.

Figure 11:
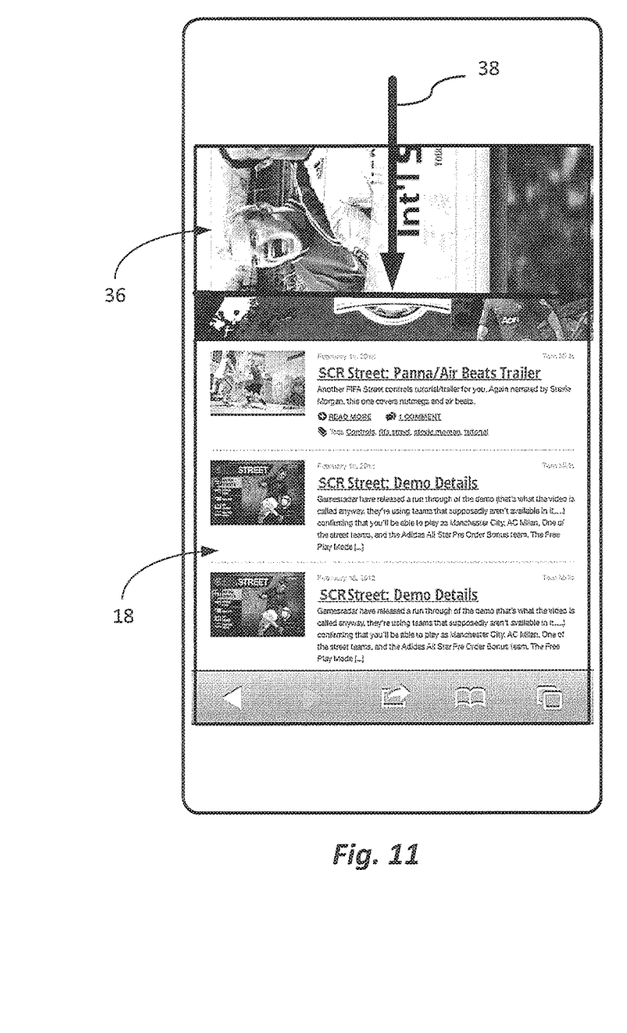
FIG. 11 is an illustration of a first instance of a browser interface in accordance with another embodiment.
Figure 12:
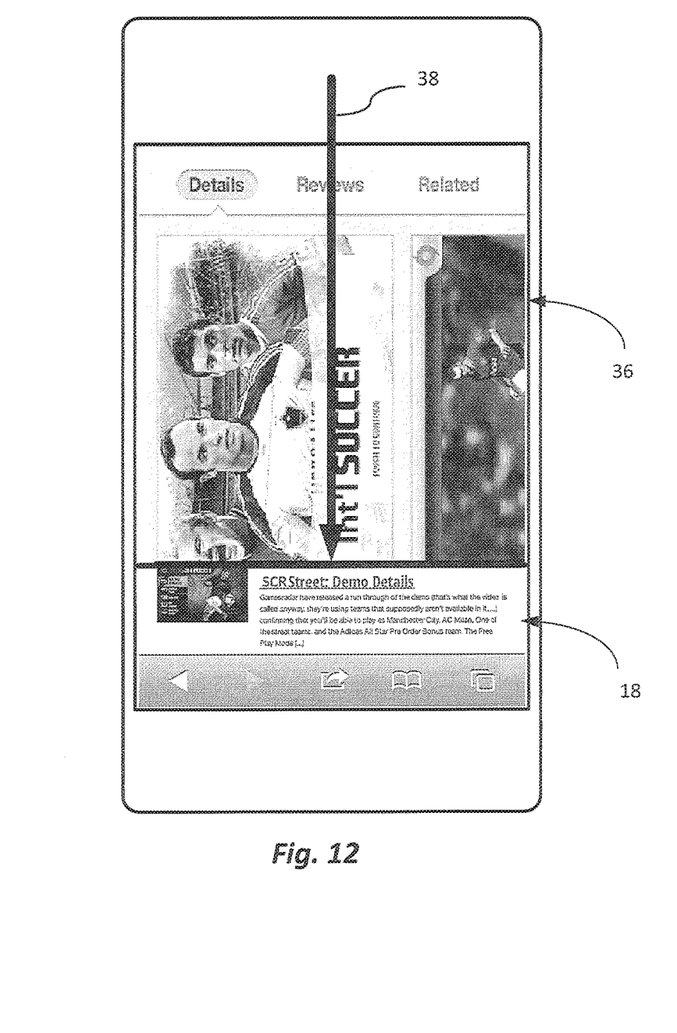
FIG. 12 is an illustration of a second instance of the browser interface.
Figure 13:
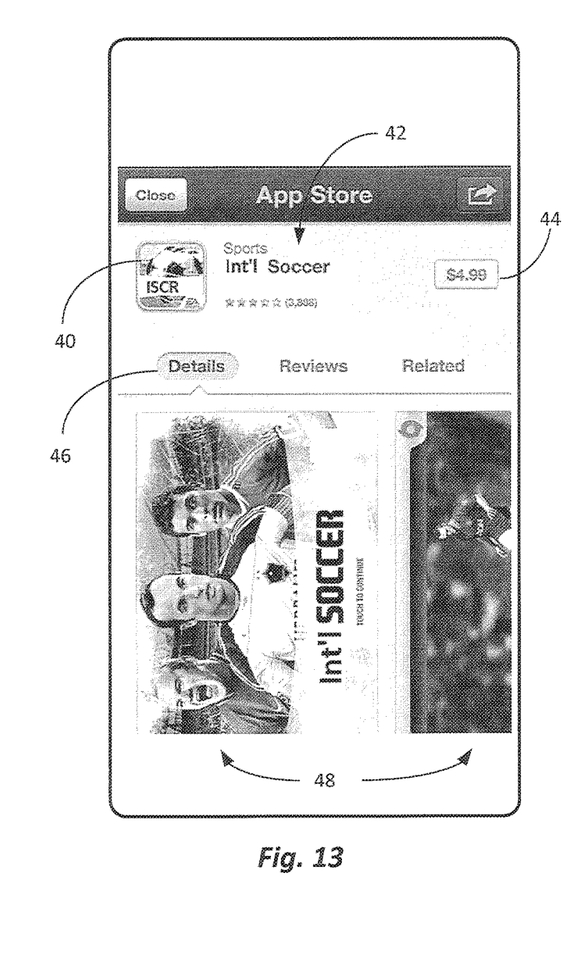
FIG. 13 is an illustration of a third instance of the browser interface.

To reinforce to the user that the original web page remains accessible, the display of the overlay sheet can be carried out with an animation that shows the sheet moving or otherwise evolving into position over the web page. FIGS. 11-13 illustrate one example of such an animation, in which the overlay sheet slides down from the top of the browser screen. Referring to FIG. 11, the original web page 18 appears within the browser viewing area. When the user clicks or taps on a link in that web page that pertains to an applet, an overlay sheet 36 begins to slide down from the top of the web page, as depicted by the arrow 38. Referring to FIG. 12, the overlay sheet continues to slide down, until it completely covers the web page as shown in FIG. 13. Of course, it will be appreciated that the overlay sheet need not completely cover the content of the web page. It is only necessary that the overlay sheet have sufficient area that the user can see the information contained on it and interact with its control features.

Referring to FIG. 13, the image of the overlay sheet for an applet can correspond to the content that would be displayed by the online applet store if the user had directly accessed the store to obtain the applet, e.g. via a web site or an applet for the online store. Alternatively, the overlay sheet could display a reduced set of content. In operation, the browser employs an applet identifier contained in the link to access a database in the online applet store and obtain the information to be displayed. In the illustrated example, the overlay sheet includes a thumbnail image 40 for the applet, its name 42 and possibly other descriptive information, and an action button 44 showing its price. In addition, the overlay sheet may contain other selectable buttons 46 that link to the online store and enable the user to obtain further information about the applet. For instance, a "Details" button may enable the user to scroll through various screen images 48 associated with play of the game implemented by the applet.

Figure 14:
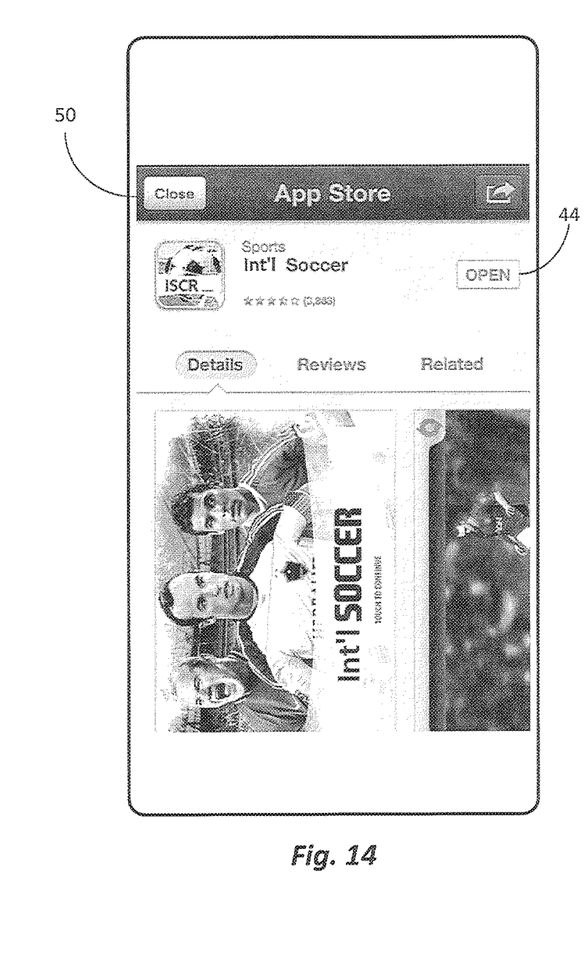
FIG. 14 is an illustration of a fourth instance of the browser interface.

The functionality provided by the overlay sheet 36 is similar to that described previously with respect to the banner 20. Through a sequence of screens displayed in response to successive taps or clicks on the action button 44, the user can initiate the process of purchasing the applet, confirm his or her desire to purchase it, authenticate himself or herself to the online applet store, and download the applet for installation on the computing device. After the installation is complete, the overlay sheet 36 may present an image such as that shown in FIG. 14, in which the button 44 provides an opportunity for the user to immediately launch the applet. Alternatively, if the user does not desire to use the applet right away, he or she can tap or click a close button 50, to dismiss the overlay sheet and return to the web page that was previously being viewed.

In the example of FIGS. 11-13, the overlay sheet slides down over the web page from the top of the browser viewing area. It will be appreciated that other types of animation can also be employed to convey the impression that the overlay sheet is distinct from the web page content, e.g. slide up from the bottom or from one of the sides, unfold from the center of the web page, grow or emerge from an icon on the display, etc. Another mechanism that can be employed in place of, or together with, an animation is to change the appearance of the window or frame in which the overlay sheet appears. For instance, if the browser frame normally appears in a bright chrome color, it could change to black when the overlay sheet is displayed. Such a change helps the user to understand that the overlay sheet is associated with a resource different from the content of the web page.

Figure 15:
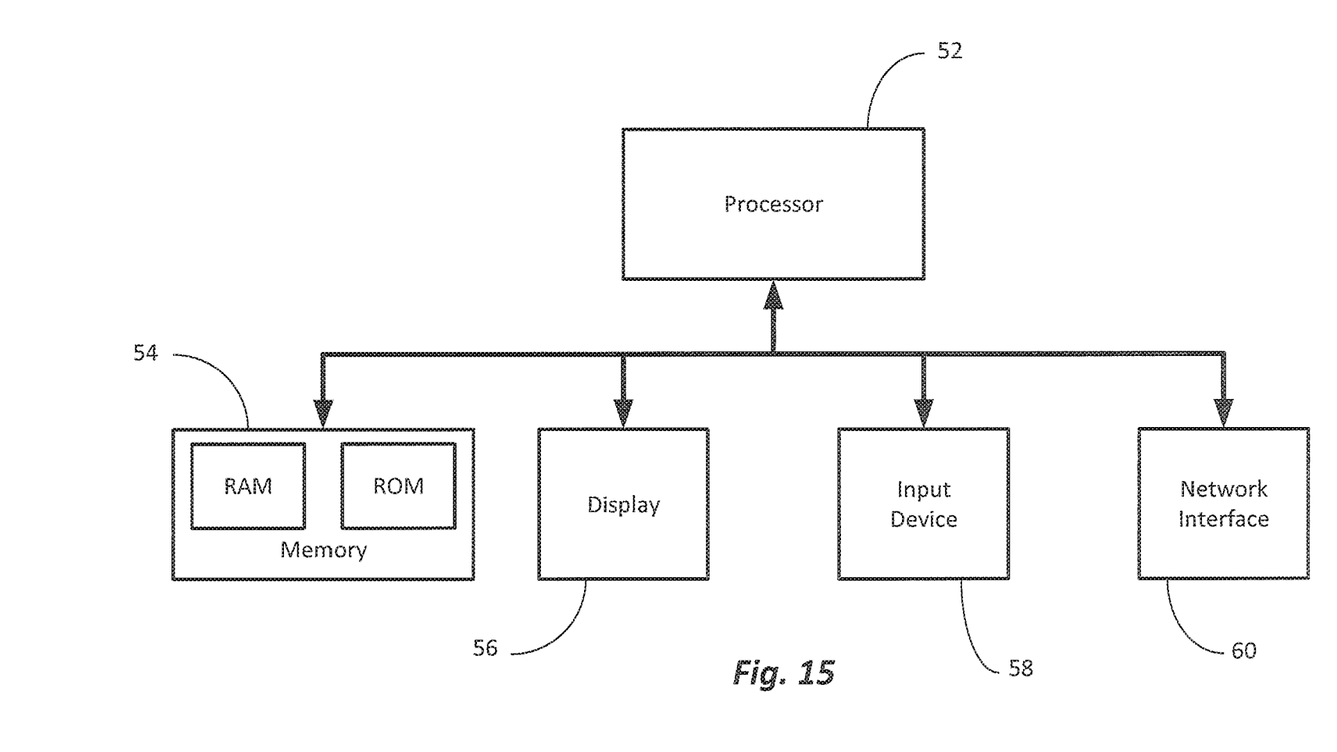
FIG. 15 is a block diagram of the structure of a computing device in which the browser can be implemented.

The illustrated examples of the browser interface depict its appearance on a hand-held computing device, such as a smartphone. It will be appreciated that the implementation of the browser is not limited to this type of device. Rather, it is capable of being used in any type of computing device, including but not limited to tablet computers, laptop computers, desktop computers, and the like. Referring to FIG. 15, a computing device suitable for use with the browser includes a processor 52 operatively connected to one or more forms of computer-readable storage media 54, e.g. RAM, ROM, flash memory, optical and/or magnetic disk drives, etc. The storage media can be integral with the computing device, attachable to the computing device, e.g. a flash drive, or accessible via a wired or wireless network. The processor is also connected to a display device 56 and an input device 58. In some forms of computing devices, the display device and input device could be integrated, e.g. a touch screen, whereas in other they may be separate components, e.g. a monitor and a keyboard. The computing device also includes at least one wired and/or wireless network interface 60 for connection to a network, such as the Internet, having access to the resources from which web pages and product data are obtained.

Figure 16:
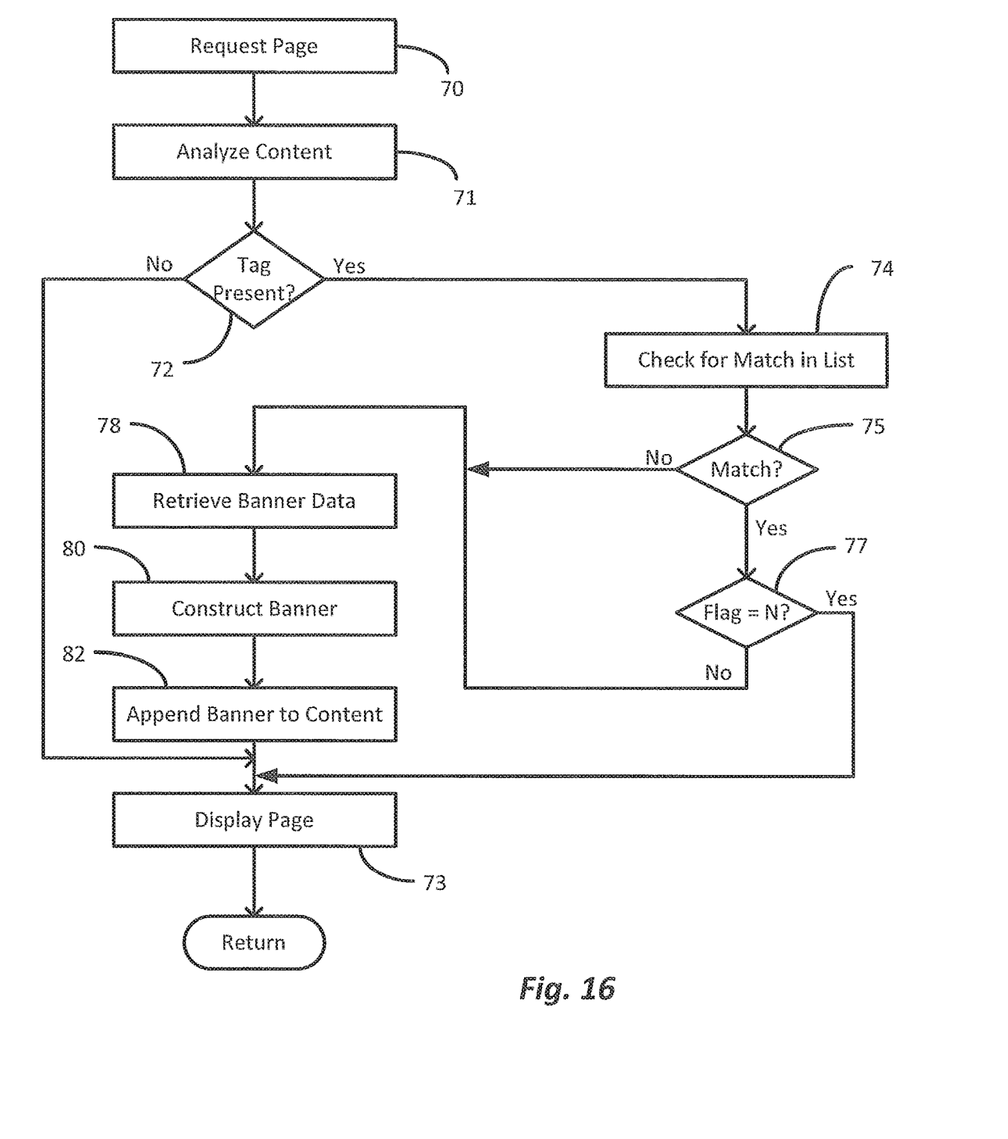
FIGS. 16-18 are flowcharts of the operations performed by the browser in accordance with one embodiment.
Figure 17:
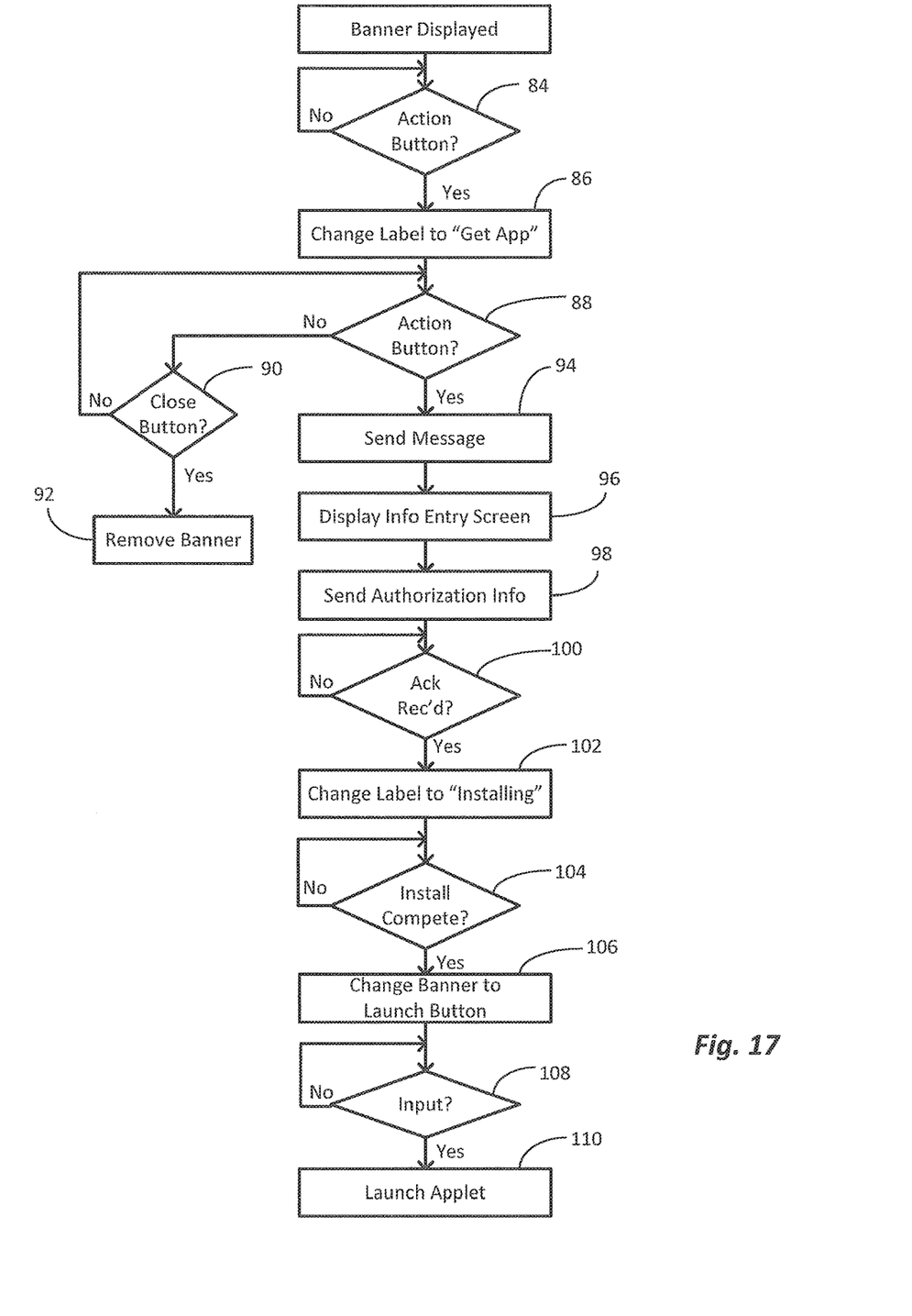
Figure 18:
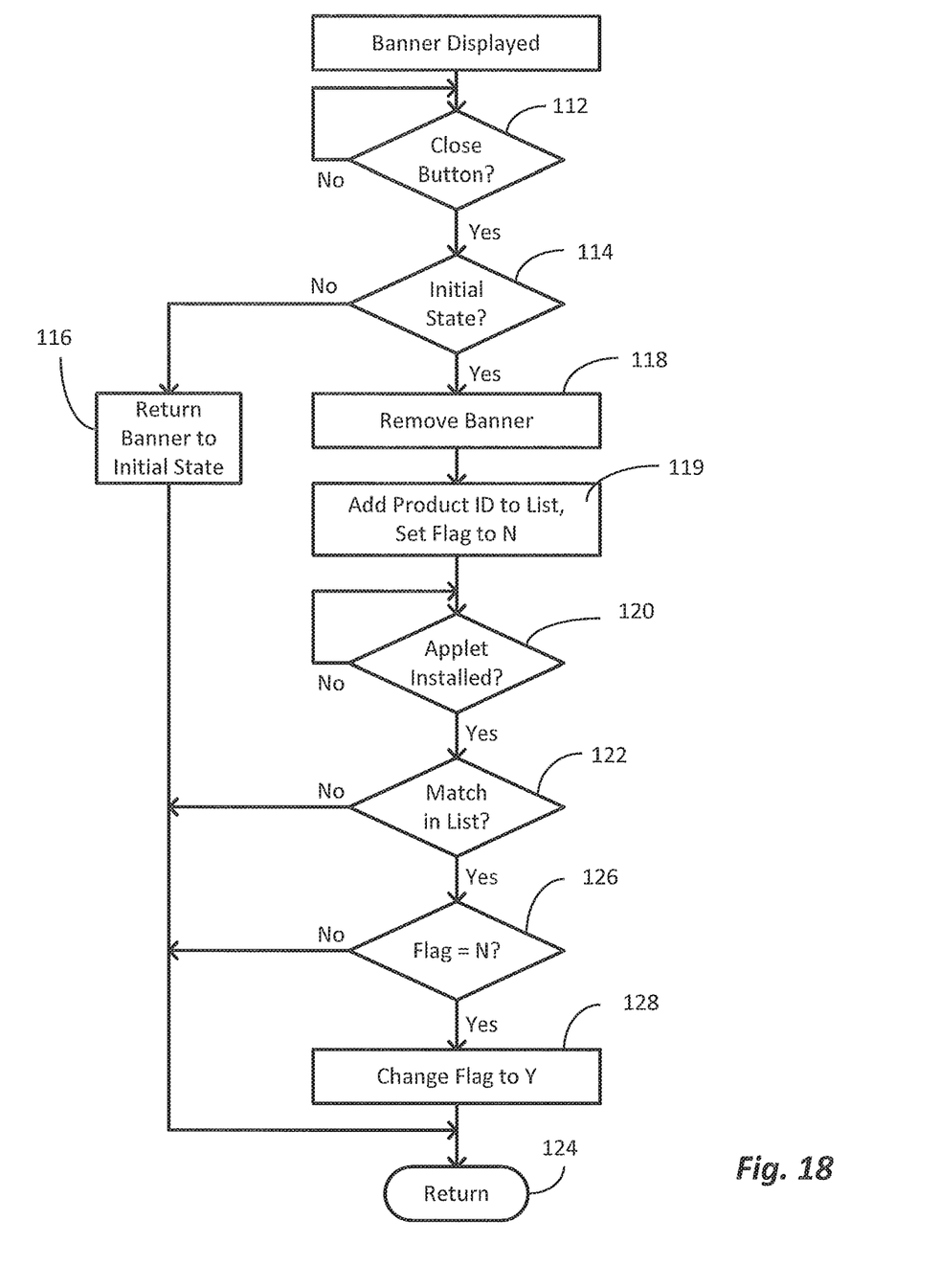

The program instructions to implement the browser described herein are preferably stored in a non-volatile form of memory, such as ROM, flash drive, disk drive, etc., and loaded into RAM for execution. FIGS. 16-18 are flow charts of exemplary algorithms of operations performed by the processor, in accordance with one embodiment, when it executes the program instructions. The depicted portion of the algorithm is initiated at step 70 when a web page is being retrieved. As the web page is being downloaded, the browser analyzes its content at step 71. During the analysis, the browser determines at step 72 whether a predetermined tag, relating to a banner display, is present in the content of the web page. For instance, as in the example described previously, the browser may be looking for the identification of a particular resource, such as an online applet store, in the meta-name value of the tag. If the tag is not present, the browser displays the content of the web page that has been downloaded, at step 73.

If the tag is detected in the content of the web page at step 72, the browser proceeds to step 74 to check whether the product identified in the tag is recorded in the list of previously displayed banners, e.g. of the type shown in FIG. 4. A determination is made at step 75 whether a match has been detected with any of the entries in the list. If a match is detected, the browser determines the status of the flag associated with that product identifier, at step 77. If the flag has a value of N, indicating that the user has indicated a lack of interest in the product, the browser proceeds to step 73 and displays the web page content without any banner.

If no match was detected at step 75, or if the flag is determined to be Y at step 77, the browser proceeds to step 78 and uses the information in the tag to retrieve the data to be displayed in the banner. In the example described above, the meta-name of the tag identifies the resource from which to obtain the data. In the case of an applet, the browser uses the applet identifier to access a database at the online applet store and obtain the data for that applet. As in the examples of FIGS. 1 and 5, that data may include the thumbnail image 22 for the applet, descriptive information 24 about the applet, and its price. At step 80 the browser constructs a banner with an action button 26 and a close button 25, and adds the data retrieved from the identified resource, placing the price information within the action button 26. The browser then appends the banner to the web page content at step 82, e.g. placing it at the beginning of the body of the web page, and displays the web page at step 73.

Although not shown in the flowchart of FIG. 16, prior to accessing the online store during step 78, the browser may first determine if the applet is already installed on the user's device. In that case, a banner such as those illustrated in FIG. 3 or 9 would be constructed and displayed, to enable the user to launch the installed applet from the banner. In that situation, all of the information needed to construct the banner may already be stored on the device, and there is no need to access the online store.

The flow chart of FIG. 17 illustrates the operations that are performed if the user activates the action button 26 while the web page and banner are being displayed, in accordance with one embodiment. In its initial state, the action button is displayed with a label that shows the price of the product. At step 84 the browser determines whether the button has been activated by the user, e.g. by tapping or clicking upon it. If so, the browser changes the label on the button at step 86 to indicate that the user can retrieve the product, to enable the user to confirm his or her intent to purchase, or otherwise obtain, the product. At step 88 the browser determines whether the action button has again been activated by the user. If not, the browser detects at step 90 whether the user has activated the close button 25, e.g. the user has changed his or her mind. If so, the banner is removed from the display at step 92, in accordance with one embodiment. In another embodiment, the banner might remain in response to activation of the close button 25 at this stage, but be returned to its initial state where the action button 26 is displayed with a label indicating the price.

If activation of the action button is detected at step 88, the browser sends a message at step 94 to the identified resource, e.g. the online applet store, indicating that the user wishes to obtain the product. In return, the resource may request authentication of the user, and/or other user information. In response, the browser displays an appropriate dialog screen for the user to enter the requested information, at step 96. In an alternative embodiment, the browser may be programmed to automatically display the dialog screen when activation of the action button is detected at step 88, without the need to contact the resource first.

Once the requested information has been entered by the user, it is forwarded to the resource at step 98. The resource returns an acknowledgement if the information is correct, which is detected by the browser at step 100. In response, the browser changes the label on the display at step 102 to indicate that the product is being downloaded and installed. Upon completion of the installation, which is detected in step 104, the browser changes the banner at step 106 to become a launch button, for example as shown in FIG. 9. In this case, the action button 26 has been removed, along with the descriptive information about the applet. A label is added to inform the user that the banner can he used to launch the applet, e.g. by tapping on it. Thereafter, if the browser detects an input action on the banner at step 108, it sends a command at step 110 to launch the applet.

In the case of a physical product rather than digital content, the resource might return a confirmation of purchase, along with shipping information, at step 100. This information would be displayed at step 102, and the subsequent steps are not performed.

The flow chart of FIG. 18 depicts the operations that occur when a user activates the close button 25 on the banner. At step 112 the activation of the button is detected. In response, the browser first determines at step 114 whether the banner is in its initial state, e.g. as shown in FIG. 1 where the action button 26 is displayed with the product price as its label. If it is not, it may be the case that the user is simply canceling a purchase transaction that was initiated but not yet completed. In that case, the banner is returned to its initial state at step 116 in accordance with one embodiment, and the browser returns to its normal processing at step 124.

If the banner is determined to be in its initial state at step 114, the banner is removed from the display at step 118. In addition, the product ID 32 is added to a banner display list, and the display flag 34 associated with the product is set to N, at step 119.

At a subsequent point in time, the user may install an applet on the computing device via a mechanism other than a banner, e.g. through a direct purchase at the online applet store. The browser might register with the operating system to receive a notification each time a new applet is installed on the computing device. At step 120, the browser detects that a new applet has been installed. In that case, it checks the identifier for the applet against those stored in the banner list, at step 122. If no match is detected, no further action is taken, and the browser returns to its normal processing at step 124. If a match is detected at step 122, the browser determines the state of the applet's associated display flag at step 126. If the flag is set to N, the browser changes the flag's value to Y at step 128, so that the banner associated with that applet will again be displayed. On the other hand, if the flag's value is Y at step 126, no further action is taken.

From the foregoing, it can be seen that the disclosed browser provides a mechanism for a user to view information about a product referenced in the content of a web page that is being displayed, and purchase that product if desired, without having to navigate away from the web page. In disclosed embodiments, pertinent information and control elements to purchase the product are provided in a banner that is displayed adjacent the content of the web page, or in an overlay sheet that is displayed on top of the web page content. In both cases, the user can easily continue to view the content of the web page without having to navigate the browser to that page. Moreover, the mechanism for conducting the purchase transaction is separate and apart from the web page content, so the user can be comfortable that the privacy of information entered during the transaction remains secure.

It will be appreciated by those of ordinary skill in the art that the disclosed user interface can be embodied in other specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced therein.

What is claimed is:

1. A method to facilitate access to an application from a web page displayed in a browser on a computing device, the method comprising:

at the computing device using one or more processors:
 detecting an identification of the application in content of the web page being displayed on the computing device;
 retrieving information pertaining to the application, based upon the detected identification, from an online store via which the application can be obtained;
 generating, by an operating system of the computing device, a view of the application provided by the online store based on the retrieved information;
 displaying the view within an overlay user interface object that is separate from the content of the web page and the browser, the overlay user interface object being generated by the operating system and including an action button to trigger a function with respect to the application; and in response to an input directed to the action button within the overlay user interface object, initiating a process to perform the function with respect to the application.

2. The method of claim 1, further comprising:
accessing a database of the online store via which the application can be obtained to retrieve the information pertaining to the application.

3. The method of claim 1, further including detecting a reference object in the content of the web page that contains the identification of the application.

4. The method of claim 3, further including:
detecting a user action to remove the display of the overlay user interface object; and inhibiting further display of the overlay user interface object pertaining to the application upon subsequent downloads of web pages containing the reference object.

5. The method of claim 1, wherein the overlay user interface object is an overlay sheet that is displayed in front of at least a portion of the content of the web page.

6. The method of claim 5, wherein the identification of the application is contained within a portion of the content of the web page, and the overlay sheet is displayed in response to selection of the portion.

7. The method of claim 6, further including, when the identification is detected, checking an associated display indicator for the identified application, and selectively displaying the overlay user interface object in dependence upon the status of the display indicator.

8. A non-transitory computer-readable comprising instructions, which when executed by at least one processor, configure the at least one processor to:
detect an identification of an application in content of a web page being displayed on a computing device;
retrieve information pertaining to the application, based upon the detected identification, from an online store via which the application can be obtained: generate, by an operating system of the computing device, a view of the application provided by the online store based on the retrieved information;
display the view within an overlay user interface object that is separate from the content of the web page and the browser, the overlay user interface object being generated by the operating system and including an action button to trigger a function with respect to the application; and
in response to an input directed to the action button within the overlay user interface object, initiate a process to perform the function with respect to the application.

9. The non-transitory computer-readable of claim 8, wherein the at least one processor is further configured to:
access a database of the online store via which the application can be obtained to retrieve the information pertaining to the application.

10. The non-transitory computer-readable of claim 8, wherein the at least one processor is further configured to detect a reference object in the content of the web page that contains the identification of the application.

11. The non-transitory computer-readable of claim 10, wherein the at least one processor is further configured to:
detect a user action to remove the display of the overlay user interface object; and inhibit further display of the overlay user interface object pertaining to the application upon subsequent downloads of web pages containing the reference object.

12. The non-transitory computer-readable of claim 8, wherein the overlay user interface object is an overlay sheet that is displayed in front of at least a portion of the content of the web page.

13. The non-transitory computer-readable of claim 12, wherein the identification of the application is contained within a portion of the content of the web page, and the overlay sheet is displayed in response to selection of the portion.

14. The non-transitory computer-readable of claim 13, wherein the at least one processor is further configured to: when the identification is detected, check an associated display indicator for the identified application, and selectively display the overlay user interface object in dependence upon the status of the display indicator.

15. A system comprising:
at least one processor;
a storage device comprising instructions, which when executed by at least one processor, configure the at least one processor to:
detect an identification of an application in content of a web page being displayed on a computing device;
retrieve information pertaining to the application, based upon the detected identification, from an online store via which the application can be obtained;
generate, by an operating system of the computing device, a. view of the application provided by the online store based on the retrieved information;
display the view within an overlay user interface object that is separate from the content of the web page and the browser, the overlay user interface object being generated by the operating system and including an action button to trigger a function with respect to the application; and
in response to an input directed to the action button within the overlay user interface object, initiate a process to perform the function with respect to the application.

16. The system of claim 15, wherein the at least one processor is further configured to:
access a database of the online store via which the application can be obtained to retrieve the information pertaining to the application.

17. The system of claim 15, wherein the at least one processor is further configured to detect a reference object in the content of the web page that contains the identification of the application.

18. The system of claim 17, wherein the at least one processor is further configured to:
detect a user action to remove the display of the overlay user interface object; and inhibit further display of the overlay user interface object pertaining to the application upon subsequent downloads of web pages containing the reference object.

19. The system of claim 15, wherein the overlay user interface object is an overlay sheet that is displayed in front of at least a portion of the content of the web page.

20. The system of claim 19, wherein the identification of the application is contained within a portion of the content of the web page, and the overlay sheet is displayed in response to selection of the portion.

* * * * *